May 23, 1961     F. J. EULER, JR     2,985,762
X-RAY APPARATUS
Filed Jan. 25, 1955
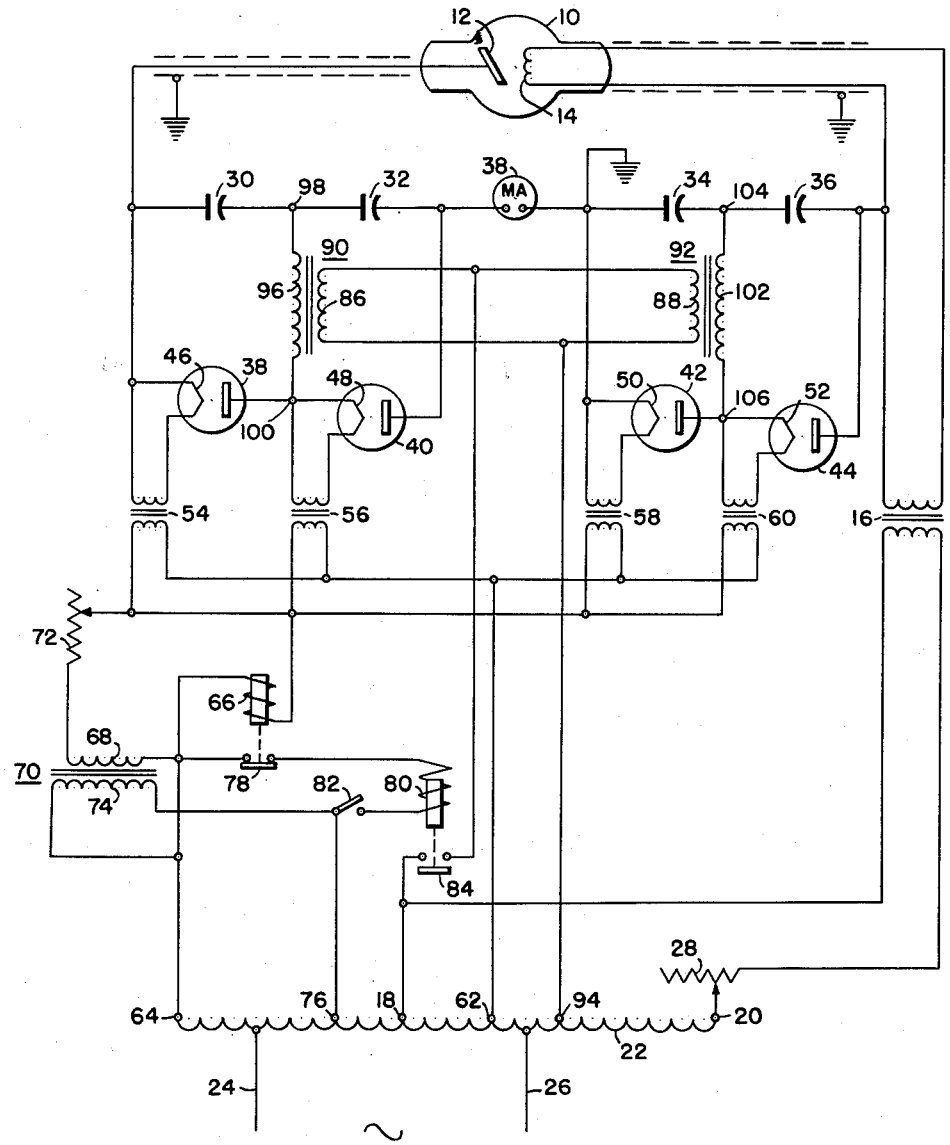
WITNESSES
Edwin E. Bassler
R. J. Brodahl
INVENTOR
Frederick J. Euler, Jr.
BY
F. E. Browder
ATTORNEY United States Patent Office 2,985,762
Patented May 23, 1961

2,985,762
X-RAY APPARATUS
Fred J. Euler, Jr., Baltimore, Md., assignor to Westinghouse Electric Corporation, East Pittsburgh, Pa., a corporation of Pennsylvania
Filed Jan. 25, 1955, Ser. No. 483,950
2 Claims. (Cl. 250—100)

The present invention relates to X-ray apparatus and more particularly to a protective circuit for X-ray apparatus.

An X-ray tube requires a rather high voltage for its operation and one source of such voltage is a circuit including a plurality of capacitors with an associated rectifier circuit for each of the capacitors to charge the latter capacitor to some predetermined voltage. The X-ray tube is connected in series with the plurality of capacitors.

It is a difficulty with such a voltage source that should one of the rectifier circuits fail, its associated capacitor loses the charge voltage of the desired polarity as the X-ray tube continues to conduct current and acquires a charge voltage of the opposite polarity. This opposite polarity voltage can in theory build up until the associated one capacitor has a charge voltage substantially equal to the sum of the charge voltages on each of the other capacitors. The latter condition usually causes a puncture failure of the one capacitor and is undesirable in many other respects.

Accordingly, it is an object of the present invention to provide an improved X-ray apparatus having a protective arrangement for the apparatus in the event of an undesired condition of the X-ray tube power supply.

It is another object to provide improved X-ray apparatus including an automatic protective feature to protect a first portion of the apparatus depending upon the failure or an undesired condition of a second portion of the apparatus.

It is an additional object to provide improved X-ray apparatus including a power source comprising a plurality of charged capacitors with a protective circuit for the capacitors to prevent damage resulting from a failure of another component of the apparatus.

It is a further object to provide a protective circuit for X-ray apparatus having a power source including a plurality of capacitors with an associated rectifier circuit for each of the capacitors.

It is still another object to provide a protective circuit for X-ray apparatus including a plurality of rectifier circuits, with a protective circuit including an element responsive to the operative condition of each of the rectifier circuits.

It is a still different object to provide a protective circuit for X-ray apparatus with said protective circuit being operative to disconnect the high voltage source or for preventing the connection of the high voltage source to the X-ray apparatus in the event of the failure of a component of the X-ray apparatus.

These and other objects of the invention are effected, as will be apparent from the following description taken in accordance with the accompanying drawing which forms a part of this application and which shows X-ray apparatus in accordance with the present invention including a protective circuit.

In the drawing there is shown an X-ray tube 10 including an anode 12 and a filament 14. A filament supply transformer 16 is connected between the filament 14 and suitable taps 18 and 20 on an autotransformer 22, which autotransformer may be connected to a suitable power source through connecting leads 24 and 26. A filament voltage adjusting resistor 28 is provided in the circuit of the filament transformer 16.

The X-ray tube 10 is connected across a plurality of series connected capacitors 30, 32, 34 and 36. A milliamperage measuring device 38 is provided in series with the latter series connected capacitors. Each of the capacitors 30, 32, 34 and 36 is provided respectively with a rectifier circuit including rectifier devices 38, 40, 42 and 44. Each of the latter rectifier devices is respectively provided with filaments 46, 48, 50 and 52. Filament supply transformers 54, 56, 58 and 60 are respectively connected to energize filaments 46, 48, 50 and 52. Each of the latter filament supply transformers are connected in a parallel circuit, which parallel circuit is connected between taps 62 and 64 on the autotransformer 22. In series with the connection between the tap 64 and the latter parallel circuit there is connected a first relay control winding 66, which in turn is connected in parallel with secondary winding 68 of a control transformer 70 and an adjustable resistor member 72. The primary winding 74 of the control transformer 70 is connected between taps 64 and 76 of the autotransformer 22. The first control winding 66 is operative to control a first switch member 78, which is in series with a second relay control winding 80 and a manually operated control switch member 82. The latter series circuit, including the first switch member 78, the second control winding 80 and the manual switch member 82 is connected between the taps 64 and 76 of the autotransformer 22. The second relay control winding 80 is operative to control a second switch member 84 which is connected in series between a tap 18 on the autotransformer 22 and one side of a parallel circuit including primary windings 86 and 88 respectively of charging transformers 90 and 92. The other side of the latter parallel circuit is connected to another tap 94 on the autotransformer 22. The secondary winding 96 of the first charging transformer 90 is connected between a junction 98 between capacitors 30 and 32 and a second junction 100 between the anode of rectifier device 38 and the filament 48 of rectifier device 40. The primary winding 102 of the second charging transformer 92 is connected between a third junction 104 between the capacitors 34 and 36 and a fourth junction 106 between an anode of the rectifier device 42 and the filament 52 of the rectifier device 44. The energy supply leads to the X-ray tube 10 are high voltage leads and accordingly may be provided with a suitable grounded shield, if desired.

In the operation of the apparatus shown in the drawing, the line voltage from the suitable power source is applied to the connecting leads 24 and 26 to energize the autotransformer 22. The manual switch member 82 is operative as an on-off control switch for the X-ray apparatus. When the latter switch 82 is closed, the second relay control winding 80 is energized to close the second switch member 84 and thereby energize the first and second charging transformers 90 and 92 to energize the respective rectifier circuits including rectifier devices 38, 40, 42 and 44.

Also, the filament circuits of the latter rectifier devices are energized through the respective filament transformers 54, 56, 58 and 60 which are connected in a parallel circuit that is connected between taps 64 and 62 on the autotransformer 22 through the first relay control winding 66.

In this respect it is to be noted that the first relay control winding 66 is responsive to the total current drawn to heat the filaments of all of the illustrated rectifier devices 38, 40, 42 and 44.

Each of the capacitors 30, 32, 34 and 36 is charged to a predetermined voltage by its respective charging circuit, which voltage may as an example be in the order of 62.5 kv. direct current, such that the X-ray tube is connected in series with the four capacitors such that a voltage is applied to the X-ray tube in the order of 250 kv. direct current. A practical value of the total current flowing in the rectifier filament circuit may be in the order of 3.7 amperes when all of the four illustrated rectifier filaments are energized, and in the order of 2.9 amperes when one of the rectifier filaments is not energized.

Part of the rectifier filament current passes through the first relay control winding 66 and part of the current flows through the parallel connected secondary winding 68 of control transformer 70 and the adjustable resistor 72. The control transformer 70 is connected between the terminals 64 and 76 of the autotransformer 22, such that the polarity of the voltage of secondary winding 68 causes a current to flow in the first relay control winding 66 in a direction opposite to the current drawn by the rectifier filament circuit including the parallel connected filament transformers 54, 56, 58 and 60 and of such a value as to buck out most of the current being drawn by the rectifier filament circuit. In this respect, the operation of the control transformer 70 and the adjustable resistor 72 is to make the operation of the first relay control winding 66 more sensitive such that a lower percentage change in the current drawn by the rectifier filament circuit may be detected by the first relay control winding 66 and thereby result in an opening of the normally closed first switch member 78. In this respect the secondary winding 68 provides a voltage across the first relay control winding 66 which bucks out or opposes most of the rectifier filament circuit current flowing through the first relay control winding 66. Thus any change in the current drawn by the rectifier filament control circuit due to a failure of any of the rectifier devices 38, 40, 42 or 44 results in a larger percentage change in the current through the first relay control winding 66. The adjustable resistor 72 in this respect is operative to improve the phase relationship of the current and voltage flowing in the circuit including the secondary winding 68, the first relay control winding 66 and the resistor 72 and to further serve as a fine adjustment of the relay closing current at which the first switch member 78 is operative.

The voltage applied by the secondary winding 68 and the adjustable resistor 72 across the first relay control winding 66 can be adjusted such that the first switch member 78 is normally closed and thus allows the second switch member 84 to be operable when the filament circuits of all four of the rectifier devices 38, 40, 42 and 44 are drawing current and are operative in the high voltage circuit. If one of the rectifier filaments should burn out, or one of the rectifier devices fails, then the total rectifier filament current flowing through the first relay control winding 66 decreases. In actual practice, the failure of one of the rectifier filaments results in a decrease in the total rectifier filament current of about 20%. This change in current is not sufficient to satisfactorily operate an ordinary relay circuit. However, with the protective circuit of the present invention, the above 20% change of current can be considerably increased as regards the percentage change in the current flowing through the first relay control winding 66. The first relay control winding 66 opens the first switch member 78 to deenergize the second relay control winding 80 and thereby open the second switch member 84 to deenergize the high voltage capacitor charging transformers 90 and 92. In this respect the illustrated apparatus is operative to deenergize the high voltage circuit if the latter was operating at the time of the failure of one of the rectifier devices or it would prevent energizing the high voltage circuit when one of the rectifier devices has already failed.

While the present invention has been shown in particularly one form only, it will be obvious to those skilled in the art that it is not so limited but is susceptible of various changes and modifications without departing from the spirit thereof.

I claim as my invention:

1. In an X-ray apparatus including a plurality of vacuum tubes, the disablement of one of which during continued operation of the others results in damage to associated circuit components, and a filament circuit for supplying alternating heater current in parallel to the filaments of said vacuum tubes; the combination therewith of switch means operable to disable all of said vacuum tubes; a relay control winding through which alternating heater current supplied to said filament circuit flows, operatively connected to said switch means; and means for causing a current flow through said relay coil winding in opposition to said alternating heater current therein whereby a variation in current in said filament circuit coincident to failure of the filament of one of said tubes will cause a greater variation in current flow through said relay coil winding to render same effective to operate said switch means.

2. In an X-ray apparatus including a plurality of vacuum tubes, the disablement of one of which during continued operation of the others results in damage to associated circuit components, and a filament circuit for supplying alternating heating current in parallel to the filaments of said vacuum tubes; the combination therewith of switch means operable to disable all of said vacuum tubes; a relay control winding through which alternating heater current supplied to said filament circuit flows, operatively connected to said switch means; and means including a transformer for causing a current flow through said relay coil winding in opposition to said alternating heater current therein whereby a given degree of reduction in alternating heater current coincident to failure of the filament in one of said tubes will cause a greater degree of change in current flow through said relay coil winding to render same effective to operate said switch means.

References Cited in the file of this patent

UNITED STATES PATENTS

| | | |
|---|---|---|
| 2,611,096 | Wright et al. | Sept. 16, 1952 |
| 2,659,015 | Lee | Nov. 12, 1953 |